United States Patent
Di Censo et al.

(10) Patent No.: US 9,809,163 B2
(45) Date of Patent: Nov. 7, 2017

(54) TECHNIQUES FOR TRANSMITTING AN ALERT TOWARDS A TARGET AREA

(71) Applicant: HARMAN INTERNATIONAL INDUSTRIES, INC., Stamford, CT (US)

(72) Inventors: Davide Di Censo, Oakland, CA (US); Stefan Marti, Oakland, CA (US)

(73) Assignee: HARMAN INTERNATIONAL INDUSTRIES, INCORPORATION, Stamford, CT (US)

( * ) Notice: Subject to any disclaimer, the term of this patent is extended or adjusted under 35 U.S.C. 154(b) by 0 days.

(21) Appl. No.: 14/686,667

(22) Filed: Apr. 14, 2015

(65) Prior Publication Data
US 2016/0304027 A1  Oct. 20, 2016

(51) Int. Cl.
B60Q 5/00 (2006.01)
G08G 1/16 (2006.01)
G06K 9/00 (2006.01)

(52) U.S. Cl.
CPC ........... B60Q 5/00 (2013.01); G06K 9/00845 (2013.01); G08G 1/162 (2013.01)

(58) Field of Classification Search
CPC ....... B60Q 5/00; G06K 9/00845; G08G 1/162
See application file for complete search history.

(56) References Cited

U.S. PATENT DOCUMENTS

| 6,011,492 A * | 1/2000 | Garesche | G08G 1/0965 340/13.25 |
| 2002/0105418 A1* | 8/2002 | Yurimoto | G08G 1/161 340/436 |
| 2003/0141966 A1* | 7/2003 | Strumolo | B60Q 1/525 340/435 |
| 2013/0261887 A1* | 10/2013 | Raz | B60Q 5/00 701/36 |

OTHER PUBLICATIONS

Extended European Search Report for Application No. 16161206.4, dated Sep. 7, 2016, 7 pages.
Winslow, "Stop Honking at me—I'm Not He Said", found http://ezinearticles.com/?Stop-Honking-At-Me---Im-Not-He-Said&id=7, Oct. 4, 2012, 2 pages.
Pennycooke, "AEVITA: Designing Biomimetic Vehicle-to-Pedestrian Communication Protocols for Autonomously Operating & Parking On-Road Electric Vehicles", found at https://dspace.mit.edu/bitstream/handle/1721.1/77810/828415927-MIT.pdf?sequence=2, 184 Pages, Sep. 2012.

* cited by examiner

*Primary Examiner* — Leon Flores
(74) *Attorney, Agent, or Firm* — Artegis Law Group, LLP

(57) ABSTRACT

A directional alert system within a vehicle is configured to transmit an alert signal towards a specifically targeted area without substantially affecting the acoustic environment in a broader surrounding area. The directional alert system determines the target area by processing sensor data reflects a direction that a driver of the vehicle is looking or facing. The directional alert system then positions an acoustic transducer to generate an acoustic signal towards the direction of (Continued)

interest. The directional alert system may also wirelessly pair with computing devices residing in a target region associated with the direction of interest, and transmit wireless notifications to those computing devices to alert the users of those devices.

16 Claims, 13 Drawing Sheets

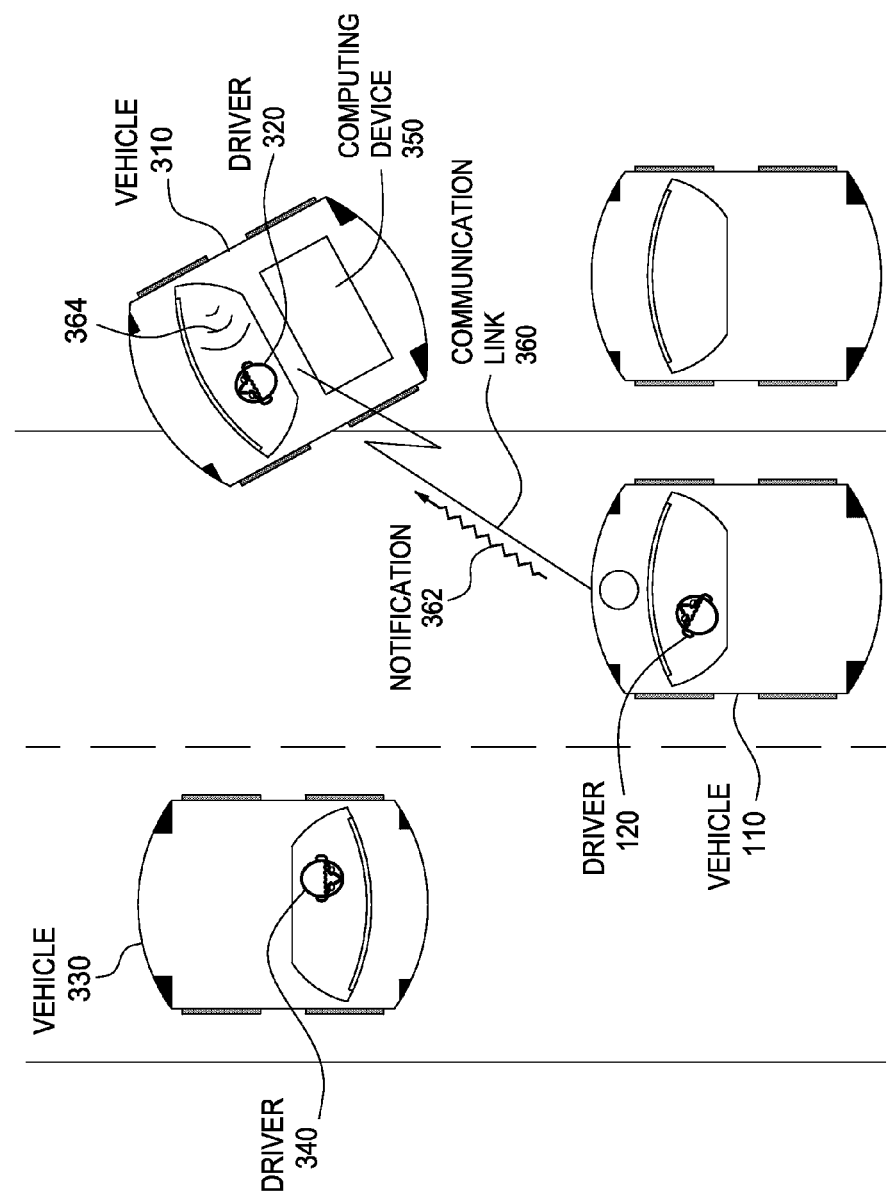

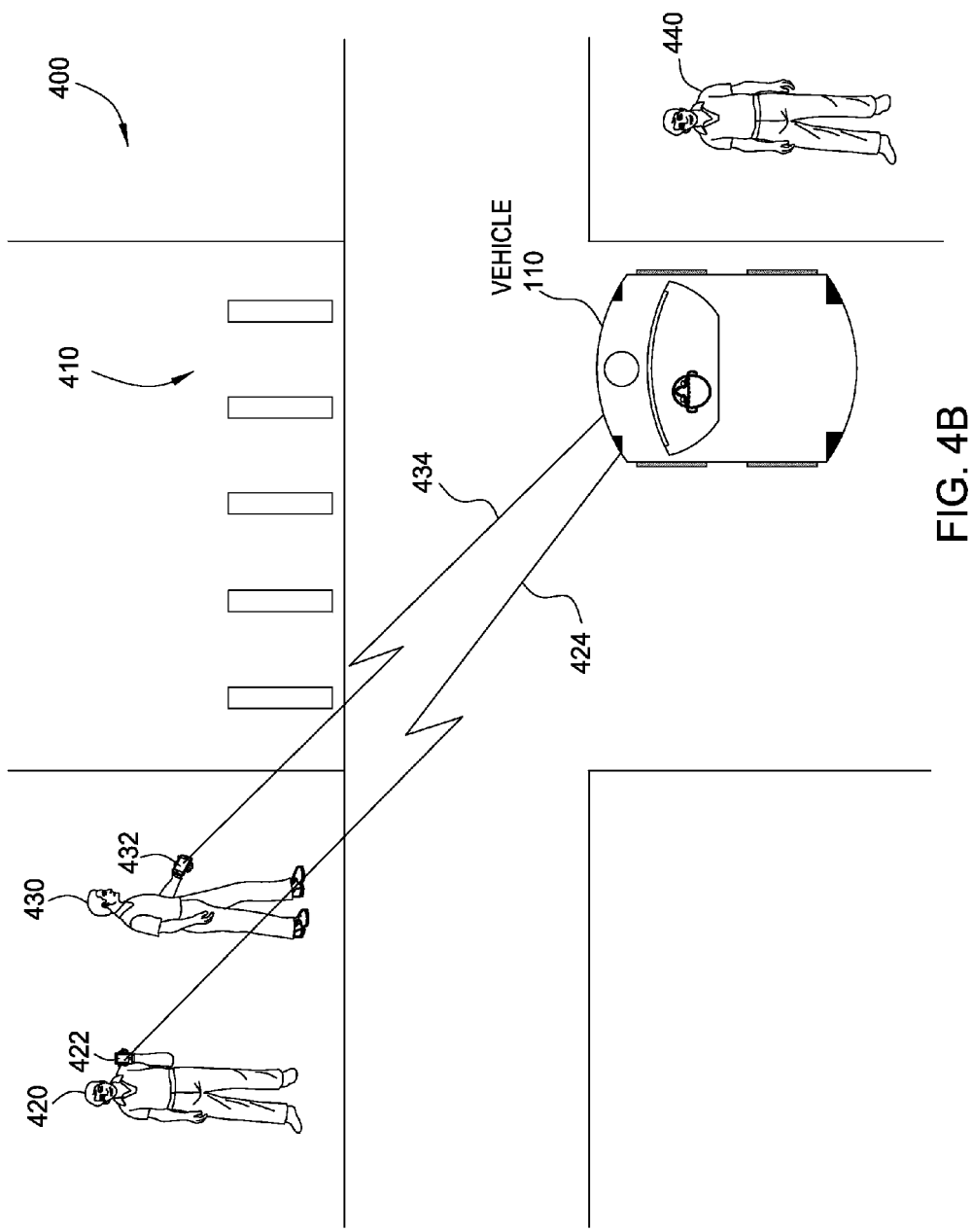

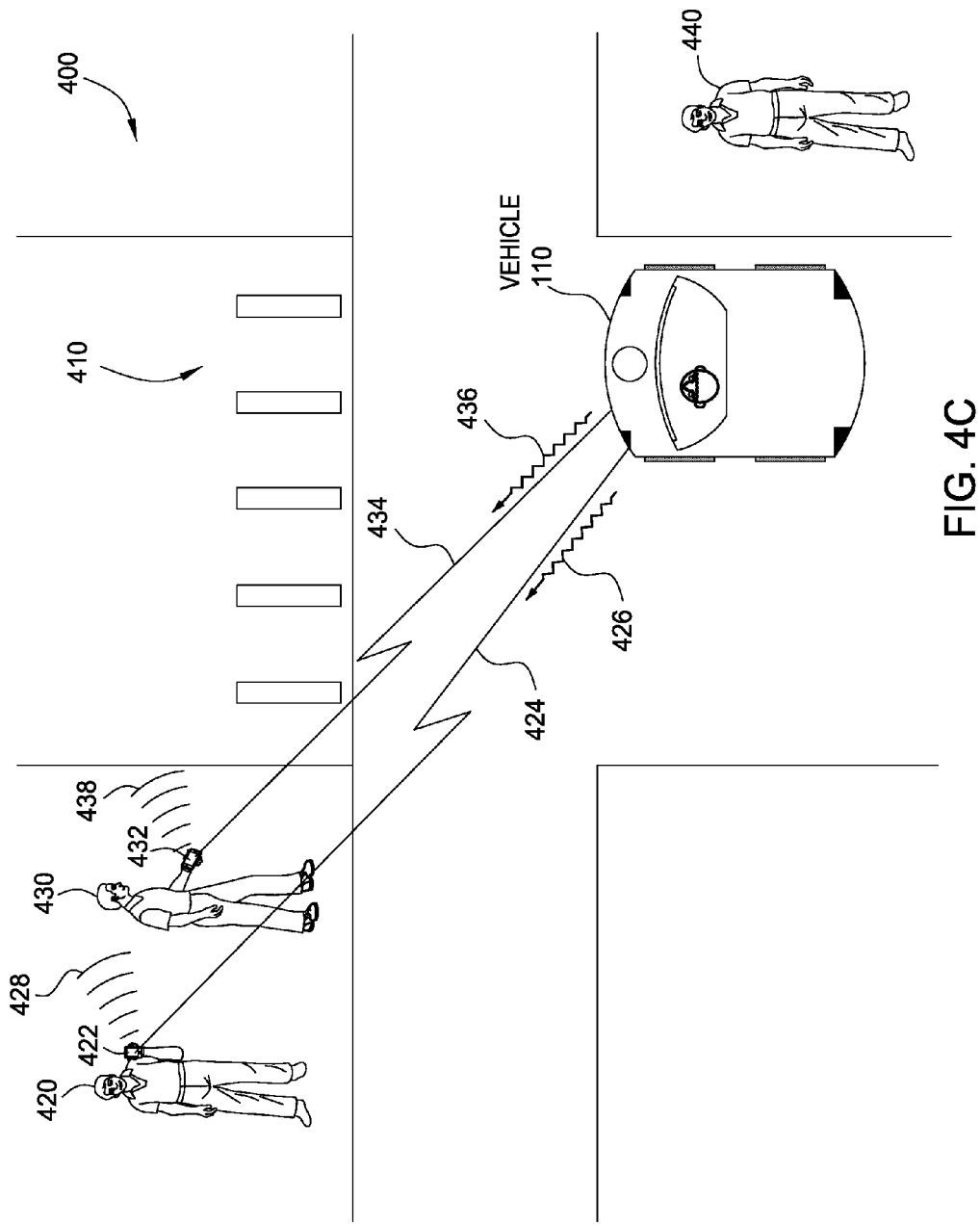

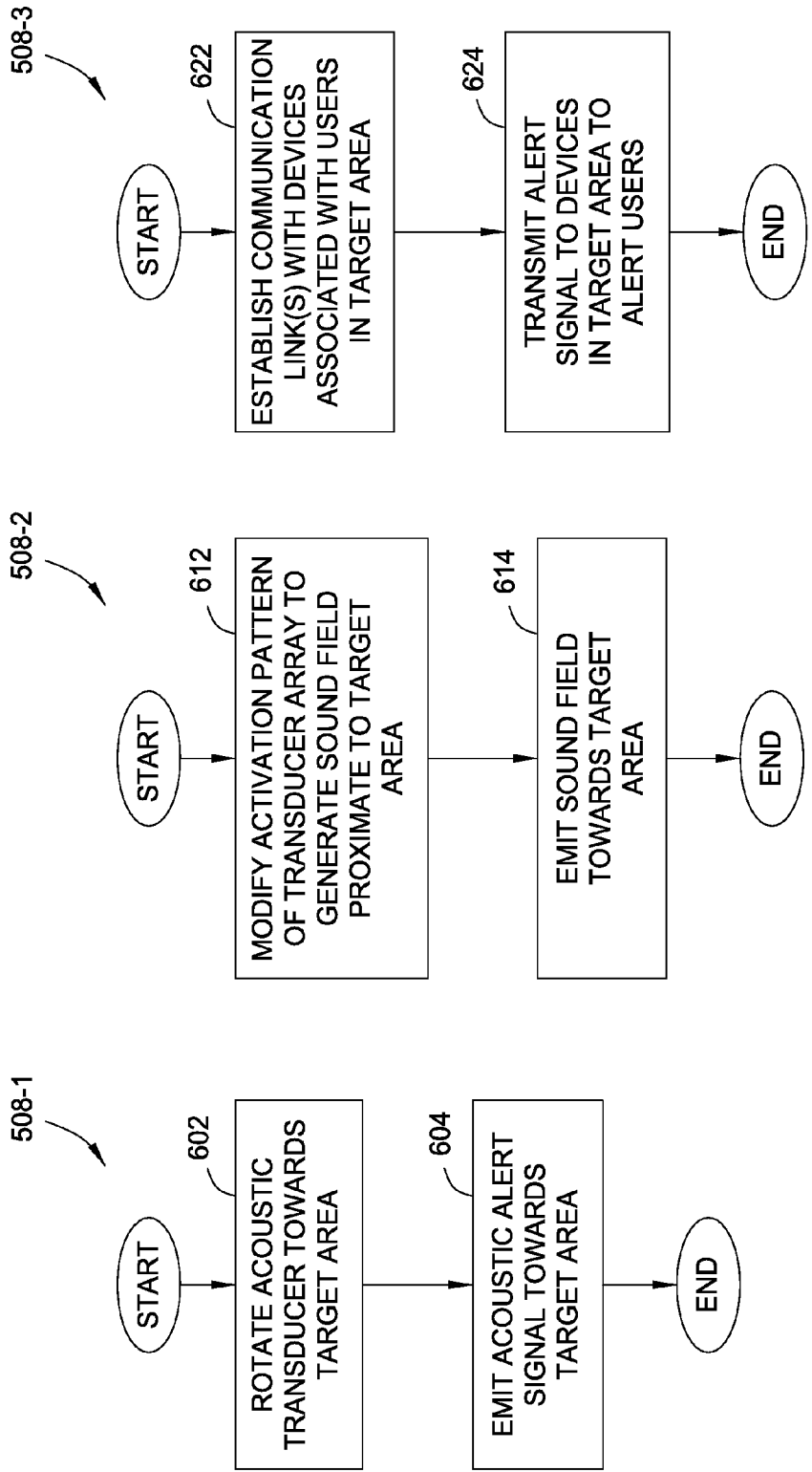

TECHNIQUES FOR TRANSMITTING AN ALERT TOWARDS A TARGET AREA

BACKGROUND

Field of the Embodiments of the Invention

Embodiments of the present invention relate generally to vehicle alert systems and, more specifically, to techniques for transmitting an alert from a vehicle towards a target area.

Description of the Related Art

A conventional vehicle includes a horn that may be activated by the driver of the vehicle in order to broadcast an acoustic signal, known as a "honk." The driver typically presses a button on the steering wheel of the vehicle in order to "honk" the horn. Horns are most often used to alert other drivers, pedestrians, animals, and so forth, to potentially unsafe circumstances. More specifically, in one scenario, if the driver of a vehicle were to notice another vehicle swerving in an unsafe manner, then the driver could honk their horn in order to alert the driver of the other vehicle that such swerving is unsafe. In another scenario, the driver of the vehicle could notice a pedestrian attempting to cross a stretch of the roadway where the driver intends to drive. The driver could then honk their horn in order to alert the pedestrian that crossing the roadway would be unsafe.

One drawback of conventional horns is that honking is omnidirectional. Consequently, when a driver of a vehicle honks his/her horn to alert an intended target, not only does the intended target of the honk hear the honking sound, many other drivers and/or pedestrians in the proximity of the vehicle may hear the honking sound as well. This is problematic because honking is loud and distracting and people generally do not want to be disturbed by honking unless absolutely necessary. As a general matter, the omnidirectionality of honking contributes to noise pollution because honks are broadcast well beyond the intended targets.

As the foregoing illustrates, what would be useful is an approach that alerts only the intended target of honking without disturbing other, non-targeted individuals.

SUMMARY

One or more embodiments set forth include a computer-implemented method for announcing the presence of a vehicle, the method comprising receiving a command to announce the presence of the vehicle, upon receipt of the command, determining a direction of interest associated with a driver of the vehicle, identifying a target region associated with the direction of interest, and transmitting a first signal towards the target region to alert a person within the target region to the presence of the vehicle.

At least one advantage of the approach described herein is that drivers of vehicles can alert other drivers, pedestrians, and animals without disturbing other, non-targeted individuals.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the invention subsumes other embodiments as well.

FIGS. 3A-3C illustrate an exemplary scenario where the directional alert system of FIGS. 1A-2C implemented in one vehicle alerts the driver of another vehicle, according to various embodiments;

FIGS. 4A-4C illustrate an exemplary scenario where the directional alert system of FIGS. 1A-2C implemented in one vehicle alerts pedestrians carrying wireless devices, according to various embodiments;

FIGS. 6A-6C are various flow diagrams of method steps that reflect different techniques for transmitting alert signals, according to various embodiments.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

System Overview

Figure 1A:
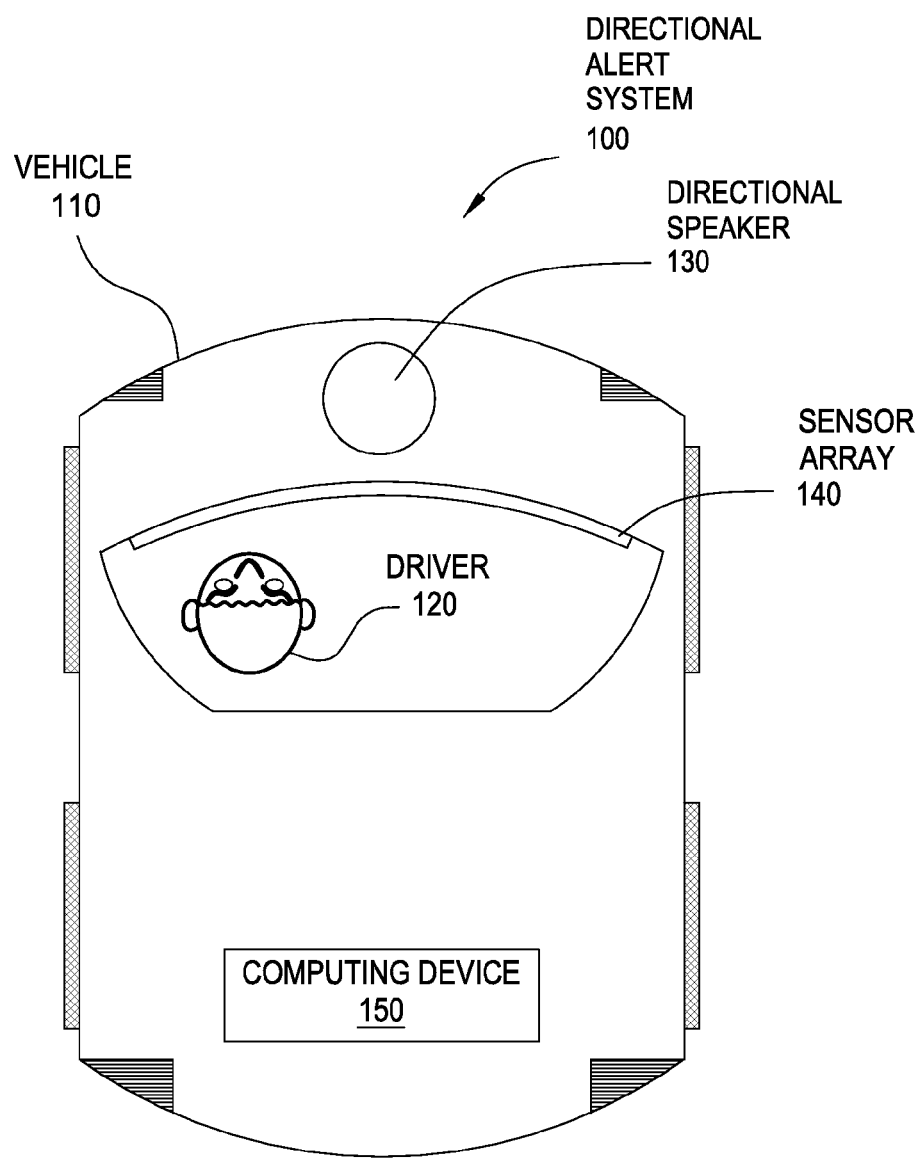
FIGS. 1A-1C illustrate a directional alert system configured to issue alert signals in a specific direction, according to various embodiments.

FIG. 1A illustrates a directional alert system 100 configured to issue alert signals in a specific direction, according to various embodiments. As shown, directional alert system 100 resides within a vehicle 110 that is operated by a driver 120. Directional alert system 100 includes a directional speaker 130, a sensor array 140, and a computing device 150, coupled together.

Directional speaker 130 includes one or more acoustic transducers configured to generate and transmit an acoustic output in a specific direction that may be of interest to driver 120, referred to hereinafter as the "direction of interest." Sensor array 140 includes sensors configured to gather data that reflects the direction of interest. Computing device 150 is a computer system configured to process the sensor data from sensor array 140 in order to determine the direction of interest, as shown in FIG. 1B.

Figure 1B:
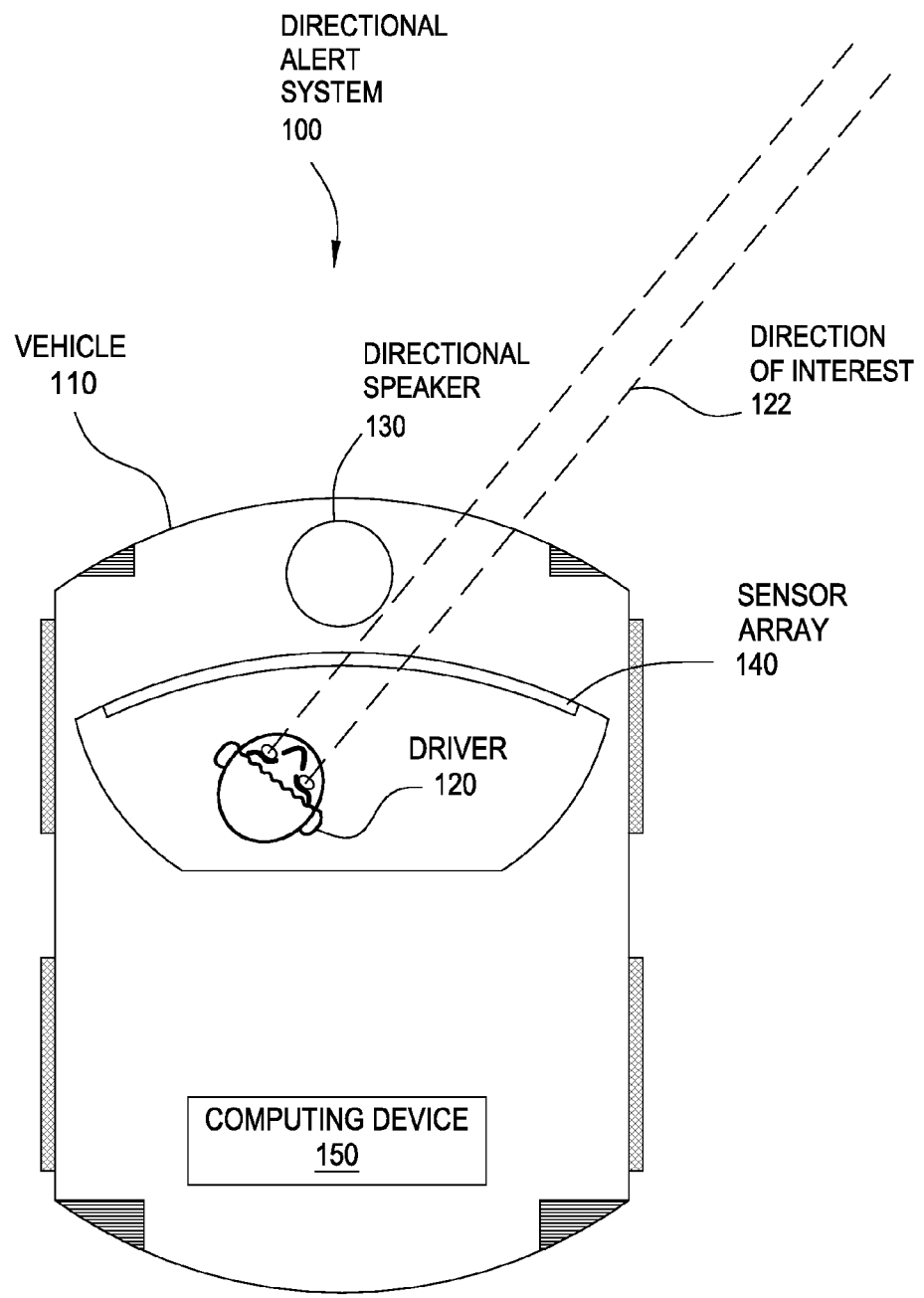

Referring now to FIG. 1B, sensor array 140 gathers sensor data regarding driver 120 and provides that data to computing device 150. Based on the gathered sensor data, computing device 150 then determines direction of interest 122. Sensor array 140 may include a wide variety of different types of sensors, including, for example, and without limitation, optical sensors, depth sensors, time of flight sensors, and so forth. In one embodiment, sensor array 140 may be an eye-gaze tracking module or a face tracking module configured to determine the direction driver 120 is looking or facing, respectively.

In one embodiment, computing device 150 exposes an interface to driver 120 that allows driver 120 to explicitly specify the direction of interest. For example, and without limitation, computing device 150 could display a graphical user interface (GUI) to driver 120 that allows driver 120 to select direction of interest 122. In another example, and without limitation, computing device 150 could monitor specific gestures performed by the user to determine direction of interest 122. Computing device 150 is described in greater detail below in conjunction with FIG. 2A.

Figure 1C:
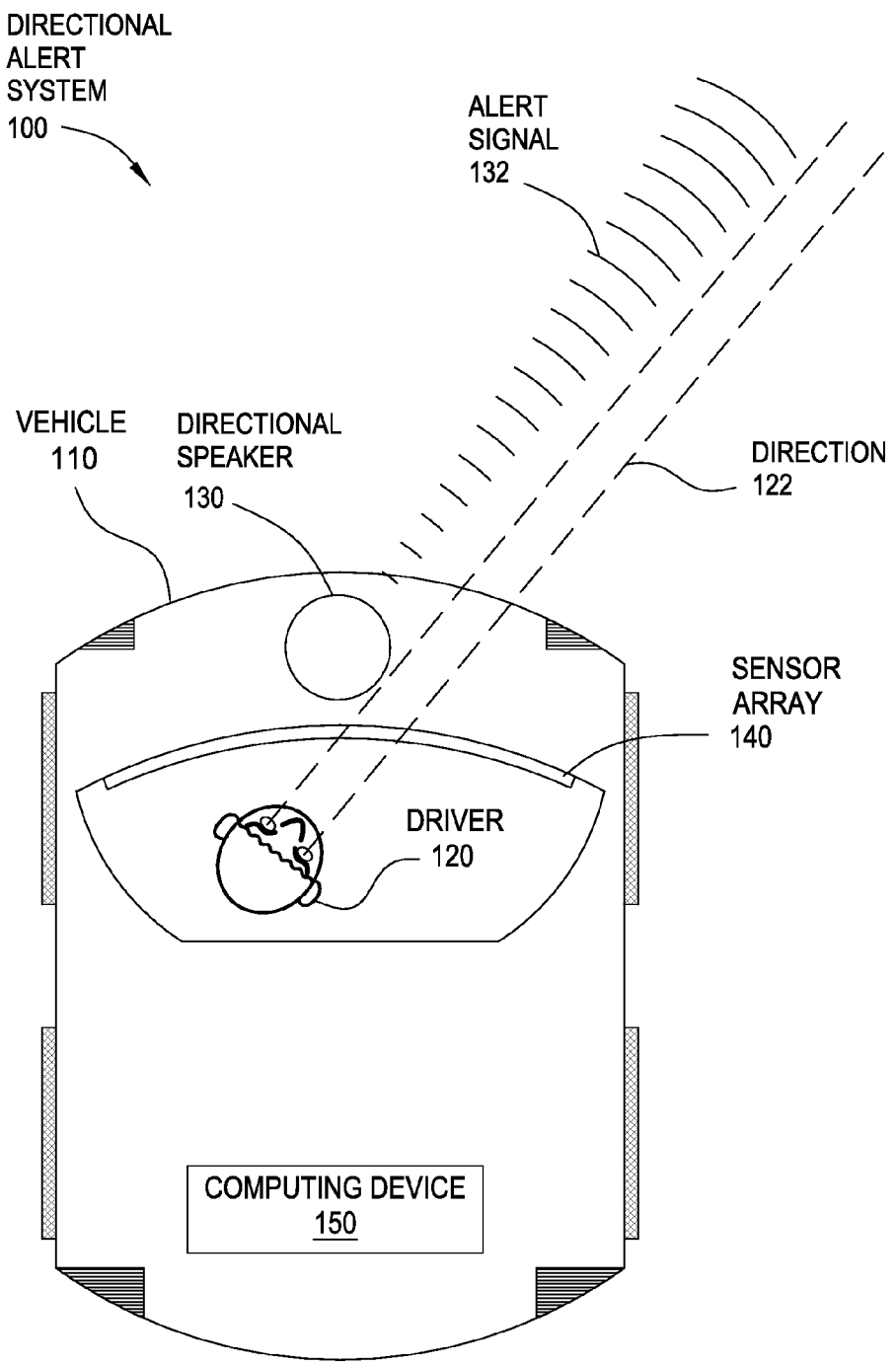

Referring now to FIG. 1C, once computing device 150 determines direction of interest 122, computing device 150 then causes directional speaker 130 to transmit alert signal 132 towards direction of interest 122. Alert signal 132 is generally an acoustic signal, such as a "honk," although computing device 150 may also cause other types of signals to be transmitted towards direction of interest, including ultrasonic, as well as non-acoustic signals.

Directional speaker 130 may include one or more acoustic transducers coupled to a mechanical actuator that is configured to reposition those transducers to align with direction of interest 122, as described in greater detail below in conjunction with FIG. 2B. Directional speaker 130 may also include an array of acoustic transducers configured to generate a sound field towards direction of interest 122, thereby focusing sound pressure in that direction, as described in greater detail below in conjunction with FIG. 2C. In addition, directional speaker 130 may also include an array of acoustic transducers coupled to a mechanical actuator configured to mechanically align the transducer array with direction of interest 122 and to generate a sound field that focuses sound pressure in that direction.

Referring generally to FIGS. 1A-1C, direction alert system 100 allows driver 110 to transmit alert signals towards specific directions, thereby improving the accuracy and precision with which alerts can be transmitted compared to traditional vehicle horns with fixed directionality. With this approach, an intended target of alert signal 132 may receive that alert, without distracting other non-targeted individuals. FIGS. 3A-4C illustrate different scenarios where directional alert system 100 may alert specific, targeted individuals without disturbing other, non-targeted individuals.

Figure 2A:
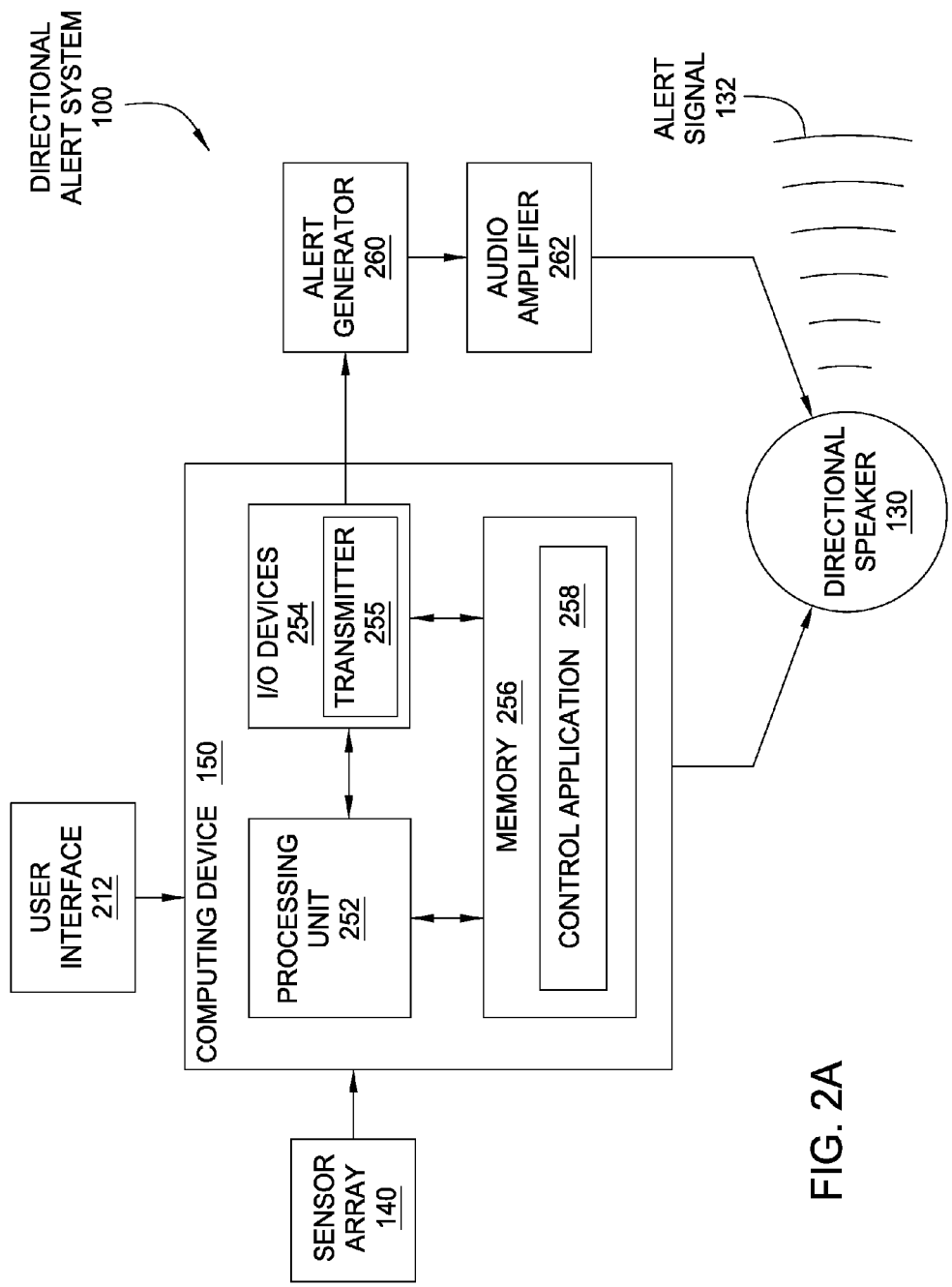
FIGS. 2A-2C are more detailed illustrations of the directional alert system of FIGS. 1A-1C, according to various embodiments.

FIG. 2A illustrates a more detailed illustration of directional alert system 100, according to various embodiments. Directional alert system 100 includes some of the same elements shown in FIGS. 1A-1C. As also shown, directional alert system 100 includes a user interface 212, an alert generator 260, and an audio amplifier 262.

User interface 212 generally includes a button that driver 110 may press to activate directional alert system 100. The button within user interface 212 could be, for example and without limitation, similar to a horn button disposed on the steering wheel of vehicle 110. User interface 212 may also include a GUI or another type of interface that allows driver 120 to specify direction of interest 122 in the fashion mentioned above in conjunction with FIG. 1B, including, e.g., via voice commands or other triggers, without limitation.

Alert generator 260 is an audio device configured to generate an alert in response to control signals received from computing device 150 when driver 110 activates directional alert system 100 via user interface 212. Audio amplifier 252 amplifies the alert generated by alert generator 260 and transmits the amplified alert to directional speaker 130. Directional speaker 130 then generates alert signal 132 toward direction of interest 122 in the fashion described above in conjunction with FIG. 1C. In one embodiment, computing device 150 includes alert generator 260 and/or audio amplifier 252.

As also shown, computing device 150 includes a processing unit 252, input/output (I/O) devices 254, and memory 256, coupled together. Memory 256 includes a control application 258. Processing unit 252 may be any technically feasible hardware unit configured to process data and/or execute software applications, including a central processing unit (CPU), microprocessor, and so forth. I/O devices 254 may include input devices, output devices, and devices configured to both receive input and provide output. In one embodiment, I/O devices 254 include a transceiver 255 configured to establish data connections with other wireless devices and transmit wireless notifications to those other devices, as also described below in conjunction with FIGS. 3C-4C. Memory 256 may be any storage medium configured to store data and software applications, including a hard disk, random access memory (RAM), and so forth.

Control application 258 within memory 256 is a software application that, when executed by processing unit 252, causes processing unit 252 to coordinate the operation of directional alert system 100 as a whole. In doing so, control application 258 may process sensor data recorded by sensor array 140 to determine direction of interest 122, then configure directional speaker 130 to transmit alert signal 132 towards direction of interest 122. Control application 260 also issues control signals to alert generator 260 to initiate the generation, amplification, and transmission of an alert. As mentioned above, directional speaker 130 may direct alert signal towards direction of interest 122 according to variety of different techniques, as described below in FIGS. 2B-2C.

Figure 2C:
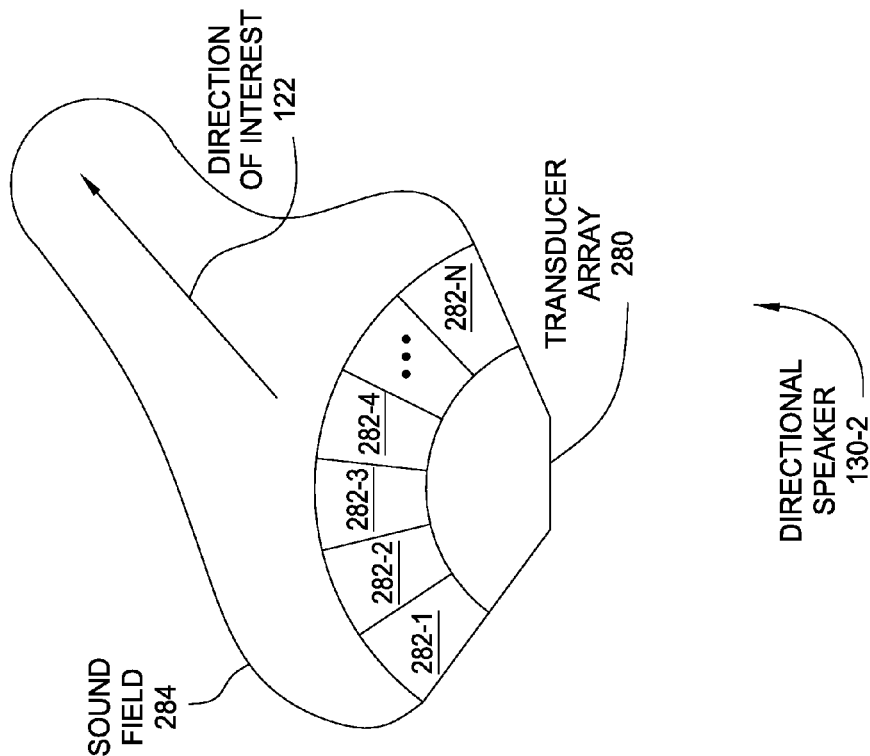
Figure 2B:
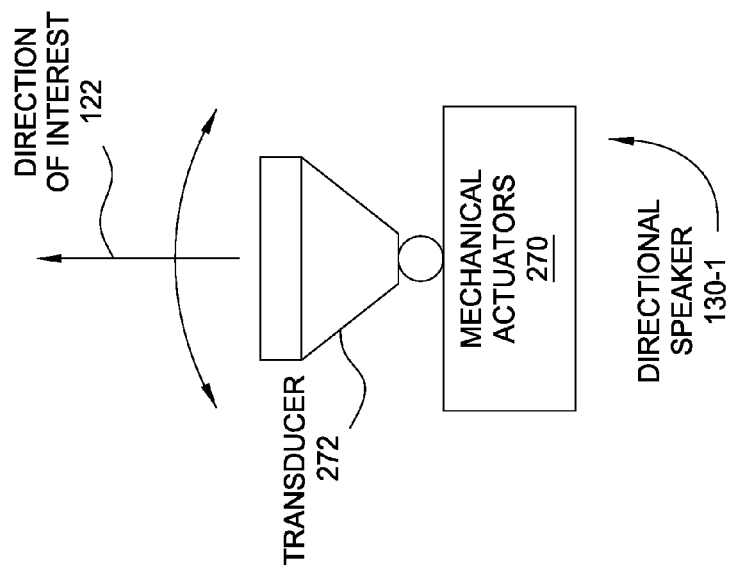

FIG. 2B illustrates one implementation of directional speaker 130, shown as directional speaker 130-1, according to various embodiments. Directional speaker 130-1 includes a mechanical actuator 270 coupled to a transducer 272. Transducer 272 is configured to transmit alert signal 132. Mechanical actuator 270 is configured to direct transducer 272 towards direction of interest 122 prior to transmitting alert signal 132. Mechanical actuator 270 may include gimbals, servomechanisms, or any other technically feasible mechanism for moving and/or rotating an object. In one embodiment, the position of transducer 272 is fixed and substantially unidirectional, and a mechanically actuated acoustic waveguide narrows the output of transducer 272 and directs that output to a specific direction upon actuation.

FIG. 2C illustrates another implementation of directional speaker 130, shown as directional speaker 130-2, according to various embodiments. Directional speaker 130-2 includes a transducer array 280 that, in turn, includes transducers 282-1 through 282-N. Each transducer 282 may be selectively activated to generate sound field 284. A given transducer 282 could be, for example, and without limitation, an acoustic transducer, a micro electrical mechanical system (MEMS) device, an ultrasonic transducer, and so forth.

In the exemplary depiction shown in FIG. 2C, sound field 284 is aligned with direction of interest 122. To generate sound field 284, directional speaker 280 could, for example, and without limitation, apply a higher activation level to transducers 282-4 through 284-N, and apply a lower activation level to transducers 282-1 through 282-3. In this fashion, directional speaker 280 may generate a steerable sound field that depends on the individual activation levels supplied to transducers 282.

In one embodiment, directional speaker 280 is a parametric speaker array or non-linear transduction mechanism where transducers 282 are activated simultaneously with individually modulated signals. Those signals may be modulated to cancel sound emitted in certain directions while allowing or amplifying sound emitted towards direction of interest 122. This approach may be implemented to generate narrow, nearly side lobe-free acoustic beams. In this embodiment, direction speaker 280 need not be curved in the fashion shown in FIG. 2C. In a further embodiment, transducers 282 may be ultrasonic transducers, and directional speaker 280 may be an "audio spotlight" type of device.

Referring generally to FIGS. 2A-2C, persons skilled in the art will recognize that the various components of directional alert system 100 shown in those Figures are provided for illustrative purposes only, and not meant to limit the scope of the invention. Any system configured to perform the functionality described herein falls within the scope of the present invention.

Exemplary Scenarios Illustrating Operation of the Directional Alert System

Figure 3A:
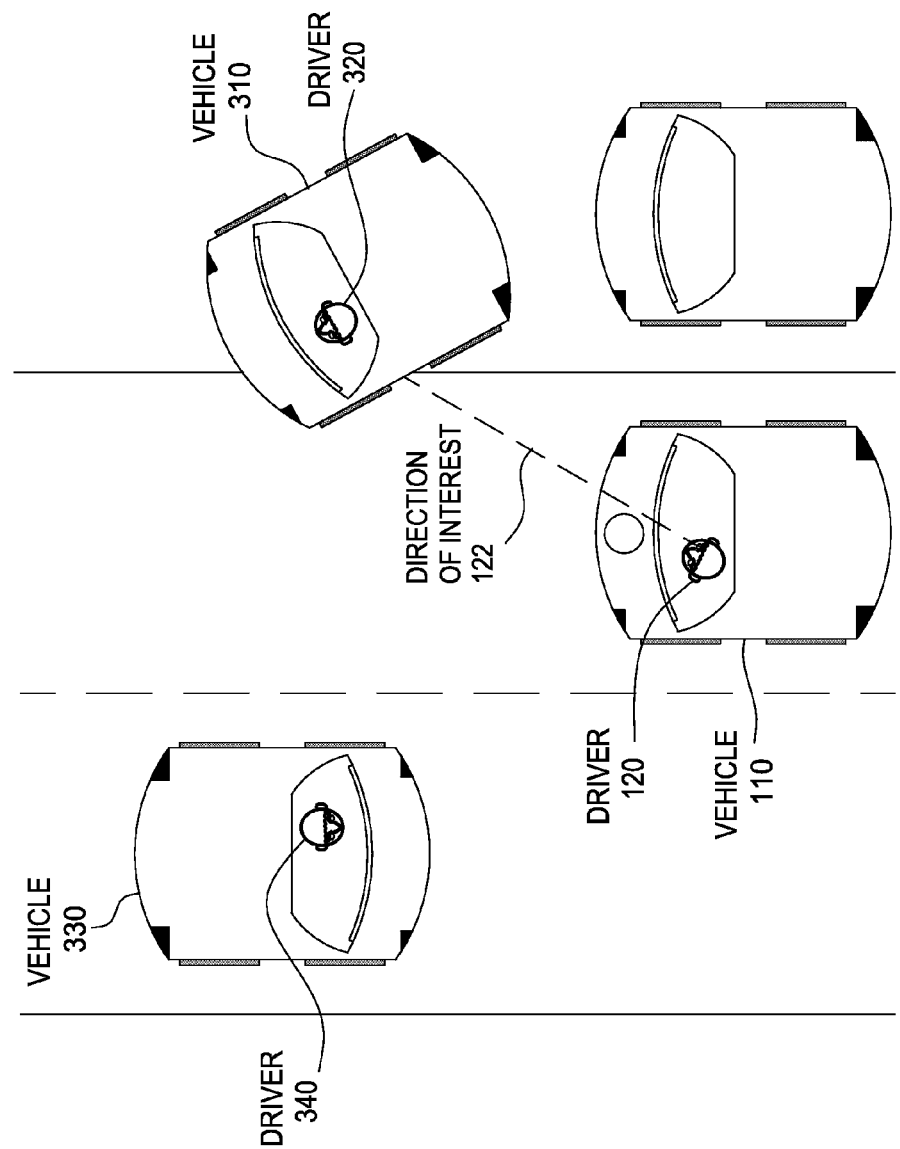
Figure 3B:
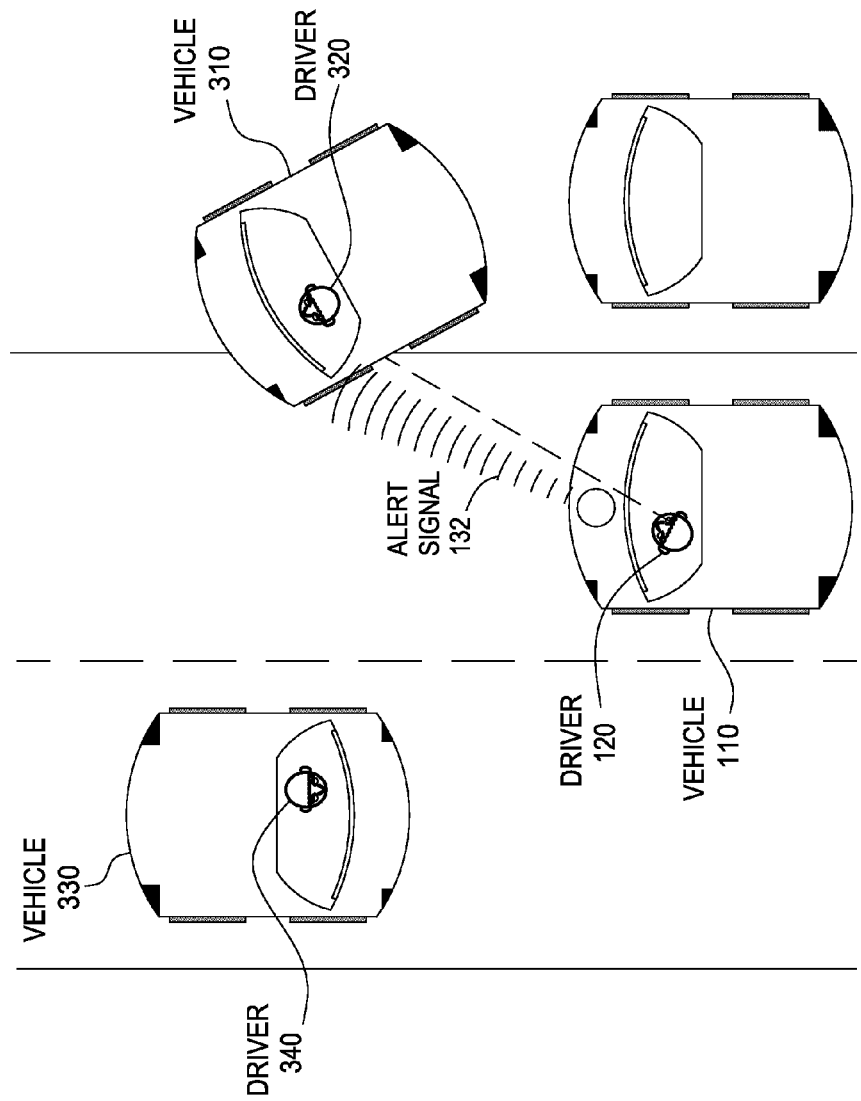

FIGS. 3A-3C illustrate an exemplary scenario where the directional alert system of FIGS. 1A-2C implemented in one vehicle alerts the driver of another vehicle, according to various embodiments. As shown in FIG. 3A, vehicle 110 travels along a roadway near other vehicles, including vehicle 310 and vehicle 330. Vehicle 330 travels along the roadway in the opposite direction as vehicle 110. Driver 320 of vehicle 310 attempts to pull out of a parking space into the roadway, potentially colliding with vehicle 110. Driver 120 notices vehicle 310 and turns to look in the direction of vehicle 310, and then activates directional alert system 100.

In response, directional alert system 100 processes sensor data gathered by sensor array 140 and then determines direction of interest 122. For example, and without limitation, directional alert system 100 could identify a direction that driver 120 is facing or looking. In one embodiment, directional alert system 100 may receive input from driver 120 that explicitly specifies direction of interest 122, including, for example and without limitation, a hand signal, a touch input to a touchscreen, a voice command, or a combination thereof.

As shown in FIG. 3B, once directional alert system 100 determines direction of interest 122, directional alert system 100 then configures directional speaker 130 to generate and project alert signal 132 towards direction of interest 122, and, thus, towards vehicle 310. Driver 320 of vehicle 310 may perceive alert signal 132 and, in response, notice the approach of vehicle 110. Driver 320 may then stop pulling out into the roadway, thereby avoiding a collision with vehicle 110. Alert signal 132 may be a wide variety of different types of signals, although generally alert signal 132 is an acoustic signal. In one embodiment, alert signal 132 is an ultrasonic signal that, upon propagating between vehicles 110 and 310 and then impinging on vehicle 310, transforms into an acoustic signal that falls within the range of human hearing.

Importantly, since alert signal 132 is specifically directed towards vehicle 310, and not broadcast omnidirectionally (as with conventional horns), driver 340 of vehicle 330 may not hear alert signal 132 at all, or may hear alert signal 132 only faintly. Accordingly, driver 340 may continue driving vehicle 330 in a relatively undisturbed manner. If driver 340 does, in fact, hear alert signal 132, the faintness of that alert signal may indicate that alert signal 132 is intended for a different driver, and so driver 340 may understand that alert signal 132 can be safely ignored.

One of the advantages of directional alert system 100 is that the drivers of vehicles may signal to one another in a focused manner without causing distractions for other drivers, pedestrians, and so forth. This type of focused signaling preserves the acoustic environment along roadways, and may reduce noise pollution otherwise caused by the less directional and/or fixed direction honking associated with conventional horns. Directional alert system 100 may further reduce noise pollution by wirelessly transmitting silent alert signals to other vehicles, as described below in conjunction with FIG. 3C.

As shown in FIG. 3C, computing device 150 is configured to establish communication link 360 with computing device 350 within vehicle 310, and to then transmit notification 362 across that communication link to computing device 350. Communication link 360 may be any type of wireless link, including a Bluetooth® link, a WiFi™ link, visible light communication link, infrared light communication link, or ultrasound communication link, among other possibilities. In general, computing devices 150 and 350 may establish wireless communication link 360 directly with one another without the need for any intervening relay mechanisms. Computing device 350 may be included within an instance of directional alert system 100 associated with vehicle 310, or may be a standalone computing device configured to receive notifications such as notification 362. For example, and without limitation, computing device 350 could be a mobile device that executes an application for receiving notifications. Upon receipt of notification 362, computing device 350 generates and emits alert signal 364 to driver 340.

Alert signal 364 may be an acoustic alert signal that is generated within the cabin of vehicle 330. Computing device 350 may also generate and display a visual notification to driver 340, or provide any other technically feasible type of alert. In one embodiment, computing device 350 may adjust one or more mirrors within vehicle 330 to point towards the source of notification 362 (in this case, towards vehicle 110). In another embodiment, computing device 350 may visually highlight the source of notification 362, either on a window or windshield of vehicle 330 or on a mirror that shows vehicle 110.

One of the advantages of transmitting notifications via a wireless communication link between vehicles is that doing so is silent, and, thus, drivers can communicate with one another without disturbing other drivers. In various embodiments, directional alert unit 100 may be configured to generate and transmit either acoustic alert signals (such as alert signal 132) and/or wireless notifications (such as notification 362) depending on the capabilities of the intended target.

For example, and without limitation, in situations where vehicle 330 includes computing device 350, directional alert system 100 may rely on communication link 330 to transmit notification 362. However, in situations where vehicle 330 lacks computing device 350, directional alert system 100 would simply generate and transmit alert signal 132. Persons skilled in the art will understand that directional alert system 100 may selectively rely on any or all of the different techniques described herein. Directional alert system 100 may also establish multiple wireless links with computing devices not necessarily included within vehicles, as described by way of example below in conjunction with FIGS. 4A-4C.

Figure 4A:
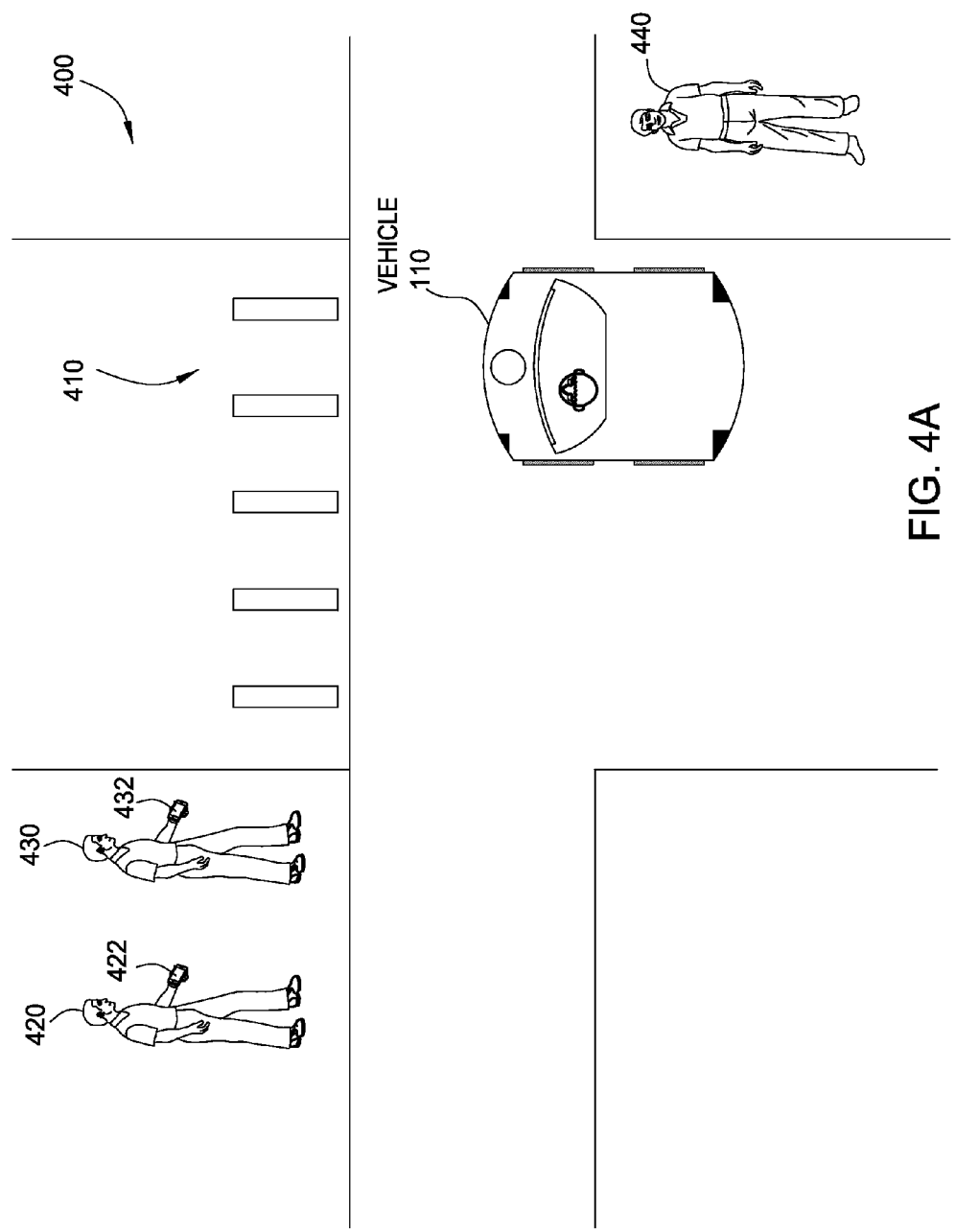

FIGS. 4A-4C illustrate an exemplary scenario where the directional alert system of FIGS. 1A-2C implemented in one vehicle alerts pedestrians carrying wireless devices, according to various embodiments. As shown in FIG. 4A, vehicle 110 approaches intersection 400 that includes a crosswalk 410. Pedestrians 420 and 430 walk towards crosswalk 410, potentially crossing in front of vehicle 110. Pedestrians 420 and 430 carry wireless computing devices 422 and 432, respectively, that are configured to communicate with directional alert system 100. Pedestrian 440 stands nearby vehicle 110.

As shown in FIG. 4B, directional alert system 100 within vehicle 110 is configured to establish communication links 424 and 434 with communication devices 422 and 432, respectively. Each of communication links 424 and 434 may be any type of wireless link, including a Bluetooth® link or a WiFi™ link, among other possibilities. In one embodiment, directional alert system 100 implements a discovery process to identify nearby computing devices with which communication links may be established. Upon discovering any such devices, directional alert system 100 then performs a pairing process with those devices to establish communication links.

In one embodiment, computing device 150 within directional alert system 100 is configured to distinguish communication devices 422 and 432 from a communication device (not shown) carried by pedestrian 440. Computing device 150 may thus determine that communication devices 422 and 432 reside within the direction of interest, and the communication device carried by pedestrian 440 does not. In order to locate communication devices 422 and 432, directional alert system 100 may include multiple RF antennas, including, for example, at least two antennas for determining a horizontal angle, and at least three additional antennas for determining a 3D vector, without limitation. With this approach, computing device 150 could then process signals received by these different antennas and determine a directional vector for each of communication links 424 and 434 via triangulation. Then, computing device 150 could correlate the direction of interest with these directional vectors, and determine that communication devices 422 and 432 reside in the direction of interest, but the communication device carried by pedestrian 440 does not.

As shown in FIG. 4C, once communication links 424 and 434 have been established, directional alert system 100 may then issue notifications 426 and 436 to computing devices 422 and 432 across communication links 424 and 434, respectively. In response to receiving such notifications, the computing devices carried by pedestrians 420 and 430 may generate an alert signal to alert those pedestrians. The alert signal could be, for example, and without limitation, an acoustic signal, a visual signal, a haptic signal, or a voice signal. Additionally, the alert signal could be a proprioceptive signal that exerts a force in a given direction, thereby guiding either of pedestrians 420 or 430 in a given direction, typically away from the direction of interest of driver 120. As is shown, computing device 422 emits alert signal 428 in response to receiving notification 426, and computing device 432 emits alert signal 438 in response to receiving notification 436. Once alerted by alert signals 428 and 438, pedestrians 420 and 430 may notice the approach of vehicle 110 and stop walking, thereby avoiding a collision with vehicle 110.

Importantly, pedestrian 440, who stands nearby vehicle 110, need not be disturbed by the transmission of notifications 426 and 436 or the emission of alert signals 428 and 438. Since notifications 426 and 436 are wireless transmissions, pedestrian 440 cannot perceive those signals. Since alert signals 428 and 438 are localized emissions that specifically target pedestrians 420 and 430, respectively, pedestrian 440 may not hear those signals or may only hear those signals faintly. Accordingly, the technique described above represents a significant improvement over conventional techniques that rely on a loud, fixed directionality or quasi-omnidirectional horn. If vehicle 110 were to implement a conventional horn to warn pedestrians 420 and 430 via honking, that honking would likely disturb pedestrian 440. However, the aforementioned techniques avoid such a scenario altogether.

Techniques for Transmitting Directional Alerts

Figure 5:
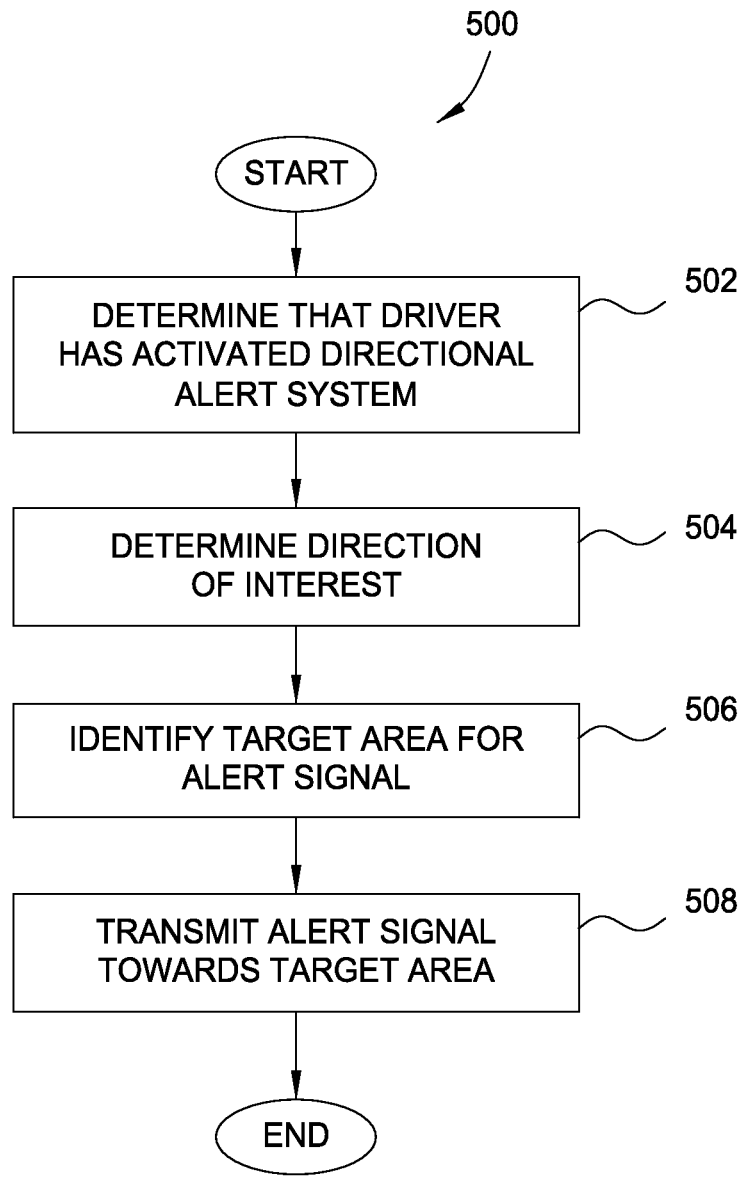
FIG. 5 is a flow diagram of method steps for transmitting an alert signal towards a target area, according to various embodiments.

FIG. 5 is a flow diagram of method steps for transmitting an alert signal towards a target area, according to various embodiments. Although the method steps are described in conjunction with the systems of FIGS. 1-4C, persons skilled in the art will understand that any system configured to perform the method steps, in any order, is within the scope of the present invention.

As shown, a method 500 begins at step 502, where control application 258, when executed by processing unit 252 within computing device 150 of directional alert system 100, determines that driver 110 has activated directional alert system 100. Driver 120 may press a button within user interface 212, issue a voice command, provide a touch input, or perform any other type of action in order to activate directional alert system 100. Generally, driver 120 activates directional alert system 100 in order to alert other drivers, pedestrians, animals, etc.

At step 504, control application 258 processes sensor data gathered by sensor array 140 to determine direction of interest 122 associated with driver 120. Direction of interest 122 may be the direction that driver 120 is facing or looking, or may reflect a direction specifically indicated by driver 120 via user interface 212. In one embodiment, sensor array 140 is an eye gaze tracking module or face tracking module configured to output to computing device 150 direction of interest 122.

At step 506, control application 258 identifies a target area for transmission of an alert signal. The target area generally subsumes direction of interest 122 and may include a variety of different entities that driver 120 wishes to alert, including other drivers, pedestrians, animals, and so forth.

At step 508, control application 258 causes an alert signal to be transmitted towards the target area identified at step 506. In doing so, control application 258 could configure acoustic hardware associated with directional speaker 130 to transmit an acoustic alert, as described in greater detail below in conjunction with FIGS. 6A-6B. Control application 258 could also configure a wireless transceiver to issue a wireless alert to one or more other computing devices that reside in the target area, as described in greater detail below in conjunction with FIG. 6C.

FIGS. 6A-6C illustrate different flow diagrams of method steps that reflect various techniques for transmitting alert signals in conjunction with step 508 of the method 500, according to various embodiments. Although the method steps are described in conjunction with the systems of FIGS. 1-4C, persons skilled in the art will understand that any system configured to perform the method steps, in any order, is within the scope of the present invention.

In FIG. 6A, a first version of step 508 of the method 500, shown as step 508-1, may be implemented when directional alert system 100 includes directional speaker 130-1 shown in FIG. 2B. At step 602, control application 258 causes mechanical actuators 270 to rotate transducer 272 towards the target area. At step 604, control application 258 causes transducer 272 to emit an acoustic signal towards the target area.

In FIG. 6B, a second version of step 508 of the method 500, shown as step 508-2, may be implemented when directional alert system 100 includes directional speaker 130-2 shown in FIG. 2C. At step 612, control application 258 causes directional speaker 280 to modify the activation pattern of transducers 282 within transducer array 280, thereby causing sound field 284 to focus sound pressure towards the target area. At step 614, control application 258 causes transducer array 280 to emit sound field 284 towards the target area.

In FIG. 6C, a third version of step 508 of the method 500, shown as step 508-3, may be implemented when directional alert system 100 is configured to transmit wireless notifications, as described above in conjunction with FIGS. 3C and 4A-4C. At step 622, control application 258 within computing device 150 establishes one or more communication links with other computing devices in the target area via transceiver 155. The communication links could be communication links 332 shown in FIG. 3C, or communication links 424 and 434 shown in FIGS. 4B-4C. At step 624, control application 258 causes transceiver 155 to transmit notifications across those communication links to cause the other computing devices to generate acoustic alert signals.

Referring generally to FIGS. 6A-6C, persons skilled in the art will understand that directional alert system 100 may rely on any one or more of the techniques described above depending on various circumstances. For example, if directional alert system 100 cannot establish a communication link with any nearby computing devices, then directional alert system 100 may default to issuing acoustic alerts via the method 600 or 610. In addition, directional alert system 100 may implement the methods 600, 610, and 620 in conjunction with one another. For example, as discussed above in conjunction with FIGS. 2B-2C, directional speaker 130 may include features of both directional speaker 130-1 and 130-2, and with such a configuration, the methods 600 and 610 may be practiced simultaneously. Furthermore, the method 620 may be performed in conjunction with either or both of the methods 600 and 610 in order to alert nearby individuals via wireless notifications as well as acoustic alerts.

In sum, a directional alert system within a vehicle is configured to transmit an alert signal towards a specifically targeted area without substantially affecting the acoustic environment in a broader surrounding area. The directional alert system determines the target area by processing sensor data reflects a direction that a driver of the vehicle is looking or facing. The directional alert system then positions an acoustic transducer to generate an acoustic signal towards the direction of interest. The directional alert system may also wirelessly pair with computing devices residing in a target region associated with the direction of interest, and transmit wireless notifications to those computing devices to alert the users of those devices.

At least one advantage of the directional alert system described herein is that drivers of vehicles can alert other drivers, pedestrians, and animals without disturbing other, non-targeted individuals. Accordingly, noise pollution can be reduced because only the targeted individuals are subject to alert signals. This functionality represents a significant improvement over conventional, substantially omnidirectional horns that broadcast loud and disturbing honking in all directions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for announcing the presence of a vehicle, the method comprising:
    receiving a command to announce the presence of the vehicle;
    upon receipt of the command, determining a direction of interest associated with a driver of the vehicle;
    determining, via a plurality of antennas, that a device resides in the direction of interest; and
    based on determining that the device resides in the direction of interest, transmitting, via a wireless communication link, a first signal towards the device, wherein the first signal causes the device to generate an alert to announce the presence of the vehicle.

2. The computer-implemented method of claim 1, wherein receiving the command comprises at least one of receiving a button press performed by the driver, receiving a gesture from the driver, receiving a voice command from the driver, and receiving a touch input from the driver.

3. The computer-implemented method of claim 1, wherein the command indicates the direction of interest, and determining the direction of interest comprises parsing the command to identify the direction of interest.

4. The computer-implemented method of claim 1, wherein determining the direction of interest comprises determining a direction the driver is looking or facing.

5. The computer-implemented method of claim 1, further comprising repositioning a transducer to align with the direction of interest to transmit the first signal towards the target region.

6. The computer-implemented method of claim 1, wherein the first signal comprises a wireless transmission that, upon receipt by the device, causes the device to emit a signal to alert the person.

7. The computer-implemented method of claim 6, further comprising:
    discovering the device via a device discovery process; and
    establishing a wireless connection with the device to enable the device to receive the first signal.

8. The method of claim 1, further comprising:
    determining, via the plurality of antennas, a directional vector that corresponds to a location of the device relative to the vehicle, and
    determining that the device resides in the direction of interest based on the directional vector.

9. The method of claim 8, further comprising, in response to determining that the device resides in the direction of interest, establishing the wireless communication link with the device.

10. A system configured to announce the presence of a vehicle, comprising:
    a sensor array configured to gather sensor data associated with a driver of the vehicle;
    a computing device configured to:
        receive a command to announce the presence of the vehicle,
        upon receipt of the command, process the sensor data to determine a direction of interest associated with the driver of the vehicle, and
        determine, via a plurality of antennas, that a device resides in the direction of interest; and
    a transmitter configured to transmit, via a wireless communication link, a first signal towards the device, wherein the first signal causes the device to generate an alert to announce the presence of the vehicle.

11. The system of claim 10, wherein the sensor array comprises an eye gaze tracking module and the sensor data indicates a direction that the driver is looking.

12. The system of claim 10, wherein the sensor array comprises a face tracking module and the sensor data indicates a direction that the driver is facing.

13. The system of claim 10, wherein the transmitter comprises a wireless transceiver configured to:
    establish a wireless connection with the device; and
    transmit the first signal to the device, wherein, upon receipt of the first signal, the device generates and emits an alert signal to alert the one or more entities within a target region to the presence of the vehicle.

14. A non-transitory computer-readable medium storing program instructions that, when executed by a processing unit, cause the processing unit to announce the presence of a vehicle, by performing the steps of:
    receiving a command to announce the presence of the vehicle;
    upon receipt of the command, determining a direction of interest associated with the driver of the vehicle;
    determining, via a plurality of antennas, that a device resides in the direction of interest; and
    based on determining that the device resides in the direction of interest, transmitting, via a wireless communication link, a first signal towards the device, wherein the first signal causes the device to generate an alert to announce the presence of the vehicle.

15. The non-transitory computer-readable medium of claim 14, wherein determining the direction of interest comprises processing sensor data associated with the driver of the vehicle to determine a direction the driver is looking, facing, or indicating.

16. The non-transitory computer-readable medium of claim 14, wherein transmitting the first signal towards the device comprises causing a transmitter coupled to the processing unit to generate and emit the first signal.

\* \* \* \* \*

UNITED STATES PATENT AND TRADEMARK OFFICE
CERTIFICATE OF CORRECTION

PATENT NO. : 9,809,163 B2  
APPLICATION NO. : 14/686667  
DATED : November 7, 2017  
INVENTOR(S) : Davide Di Censo and Stefan Marti Page 1 of 1

It is certified that error appears in the above-identified patent and that said Letters Patent is hereby corrected as shown below:

On the Title Page

(73) Assignee:  
Please delete "HARMAN INTERNATIONAL INDUSTRIES, INCORPORATION" and insert  
--HARMAN INTERNATIONAL INDUSTRIES, INC.--.

Signed and Sealed this  
Sixth Day of August, 2019

Andrei Iancu  
*Director of the United States Patent and Trademark Office*